(12) United States Patent
Pitsch et al.

(10) Patent No.: US 12,486,652 B2
(45) Date of Patent: *Dec. 2, 2025

(54) HYBRID FAUCET ASSEMBLY

(71) Applicant: AS America, Inc., Piscataway, NJ (US)

(72) Inventors: Walter Pitsch, Washington, NJ (US); Xiaojing Ye, Edison, NJ (US); Weijian Zhang, Guangzhou (CN)

(73) Assignee: AS America, Inc., Piscataway, NJ (US)

( * ) Notice: Subject to any disclaimer, the term of this patent is extended or adjusted under 35 U.S.C. 154(b) by 86 days.

This patent is subject to a terminal disclaimer.

(21) Appl. No.: 18/282,262

(22) PCT Filed: Mar. 25, 2022

(86) PCT No.: PCT/US2022/021926
§ 371 (c)(1),
(2) Date: Sep. 15, 2023

(87) PCT Pub. No.: WO2022/204502
PCT Pub. Date: Sep. 29, 2022

(65) Prior Publication Data
US 2024/0159032 A1 May 16, 2024

(51) Int. Cl.
*E03C 1/05* (2006.01)
*E03C 1/04* (2006.01)
*F16K 11/00* (2006.01)

(52) U.S. Cl.
CPC .............. *E03C 1/057* (2013.01); *E03C 1/04* (2013.01); *F16K 19/006* (2013.01)

(58) Field of Classification Search
CPC ........ F16K 11/22; F16K 19/006; E03C 1/055; E03C 1/057
See application file for complete search history.

(56) References Cited

U.S. PATENT DOCUMENTS

| 4,823,414 | A | 4/1989 | Piersimoni et al. |
| 5,095,941 | A | 3/1992 | Betz |
| 7,946,504 | B2 * | 5/2011 | Shapira .............. G05D 23/1393 236/12.12 |
| 8,776,817 | B2 * | 7/2014 | Sawaski ................. E03C 1/057 137/551 |
| 9,315,976 | B2 | 4/2016 | Rodenbeck et al. |
| 10,184,232 | B2 * | 1/2019 | Veros .................... E03C 1/0404 |
| 11,802,396 | B2 * | 10/2023 | Ye ........................... E03C 1/057 |
| 2004/0143898 | A1 | 7/2004 | Jost et al. |

(Continued)

OTHER PUBLICATIONS

International Search Report mailed 06 JUY 2022 in corresponding International Application No. PCT/US22/21926 (9 pages).

*Primary Examiner* — Michael R Reid
(74) *Attorney, Agent, or Firm* — Anna-lisa L. Gallo; Tyler A. Stevenson

(57) ABSTRACT

A hybrid faucet assembly configured to operate in a touchless, hands-free automatic mode and a manual mode comprises a faucet body; a faucet spout; a first manual flow control valve connected to a cold water source; a second manual flow control valve connected to a hot water source; an electromechanical valve connected to a cold water source or to both a cold water source and a hot water source; a controller; and an activator device. The hybrid faucet assembly may comprise an override mechanism to disable an automatic mode during operation of a manual mode.

20 Claims, 6 Drawing Sheets

(56) References Cited

U.S. PATENT DOCUMENTS

| | | | |
|---|---|---|---|
| 2008/0111090 A1* | 5/2008 | Schmitt | F16K 31/05 251/129.03 |
| 2010/0287695 A1 | 11/2010 | Houghton et al. | |
| 2017/0275860 A1 | 9/2017 | Beck | |
| 2020/0087905 A1 | 3/2020 | Reeder et al. | |

* cited by examiner

HYBRID FAUCET ASSEMBLY

The disclosure relates generally to faucets. More particularly, the disclosure relates to a hybrid faucet assembly having a touch-free mode and a manual mode.

BACKGROUND

Faucets have the capability to deliver hot water, cold water, or a mixture including hot water mixed with cold water from a water source (e.g., tap or well water). Faucets may be mechanically controlled or electronically controlled. A hybrid faucet for residential bathroom use, having an ability to be operated in a touchless "hands-free" mode as well as a traditional manual mode is desired.

SUMMARY

Accordingly, disclosed is a faucet assembly comprising a faucet body; a faucet spout; a first manual flow control valve; a second manual flow control valve; an electromechanical valve; a controller; and an activator device, wherein the first manual flow control valve is configured to be fluidly connected to a cold water source and to deliver cold water to the faucet spout, the second manual flow control valve is configured to be fluidly connected to a hot water source and to deliver hot water to the faucet spout, the electromechanical valve is configured to be fluidly connected to a cold water source, the electromechanical valve, the controller, and the activator device are configured to be in electrical communication, and the controller is configured to receive a signal from the activator device indicating it has been activated, and to send a signal to the electromechanical valve to open to deliver cold water to the faucet spout.

A faucet assembly may be configured to be independently operated in a manual mode via operation of the first and/or second manual flow control valves, and to be independently operated in an automatic mode via operation of the electromechanical valve.

A faucet assembly may comprise a temperature control assembly comprising a temperature adjuster, wherein the temperature control assembly is configured to be fluidly connected to a cold water source and to a hot water source, the temperature control assembly is fluidly connected to the electromechanical valve, the electromechanical valve is configured to deliver a hot/cold water mixture to the faucet spout, and the temperature adjuster is configured to adjust a ratio of hot water and cold water in the hot/cold water mixture.

BRIEF DESCRIPTION OF THE DRAWINGS

This disclosure is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

Figure 1A:
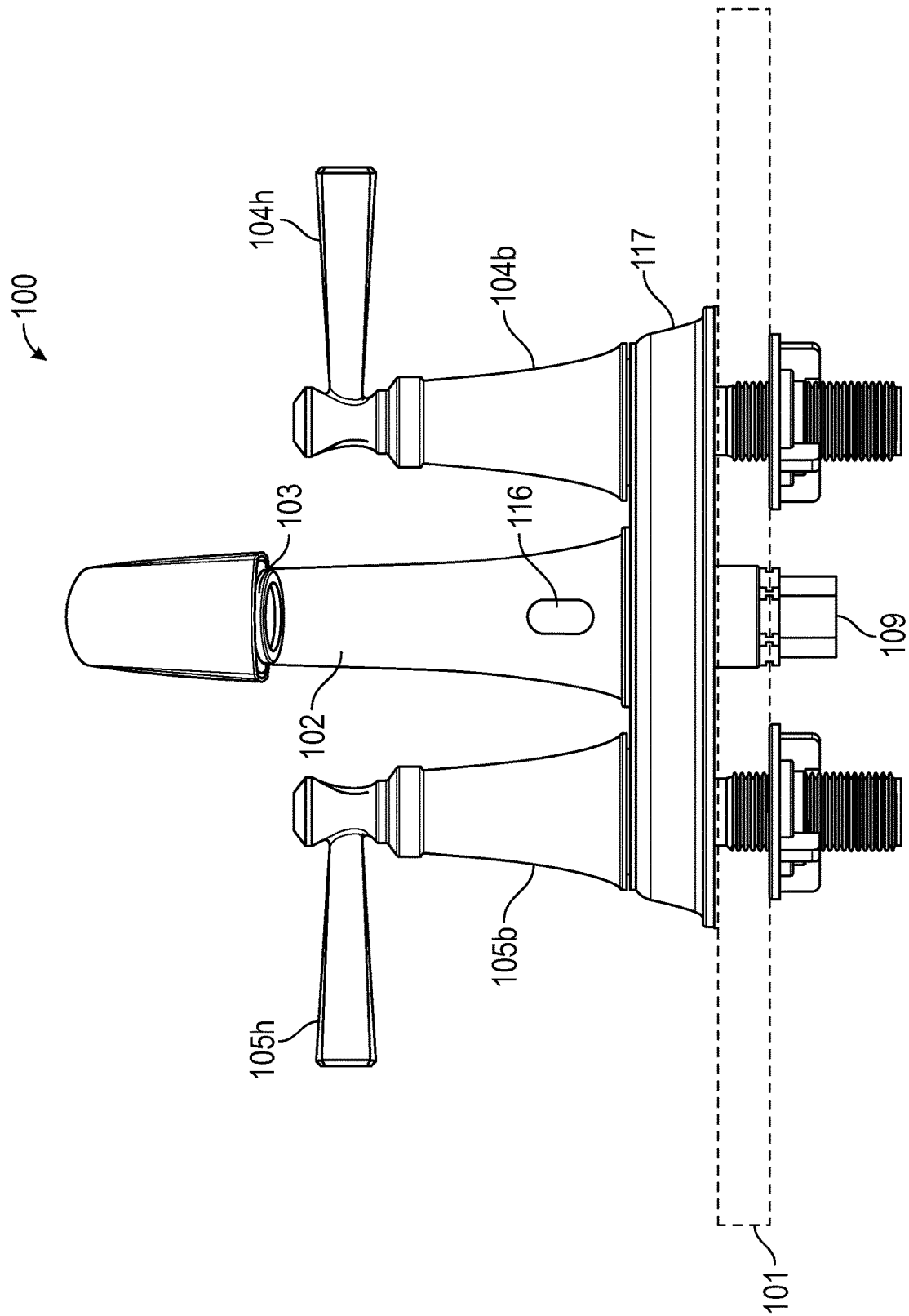
FIG. 1A is a schematic diagram of a faucet assembly, according to some embodiments.
Figure 1B:
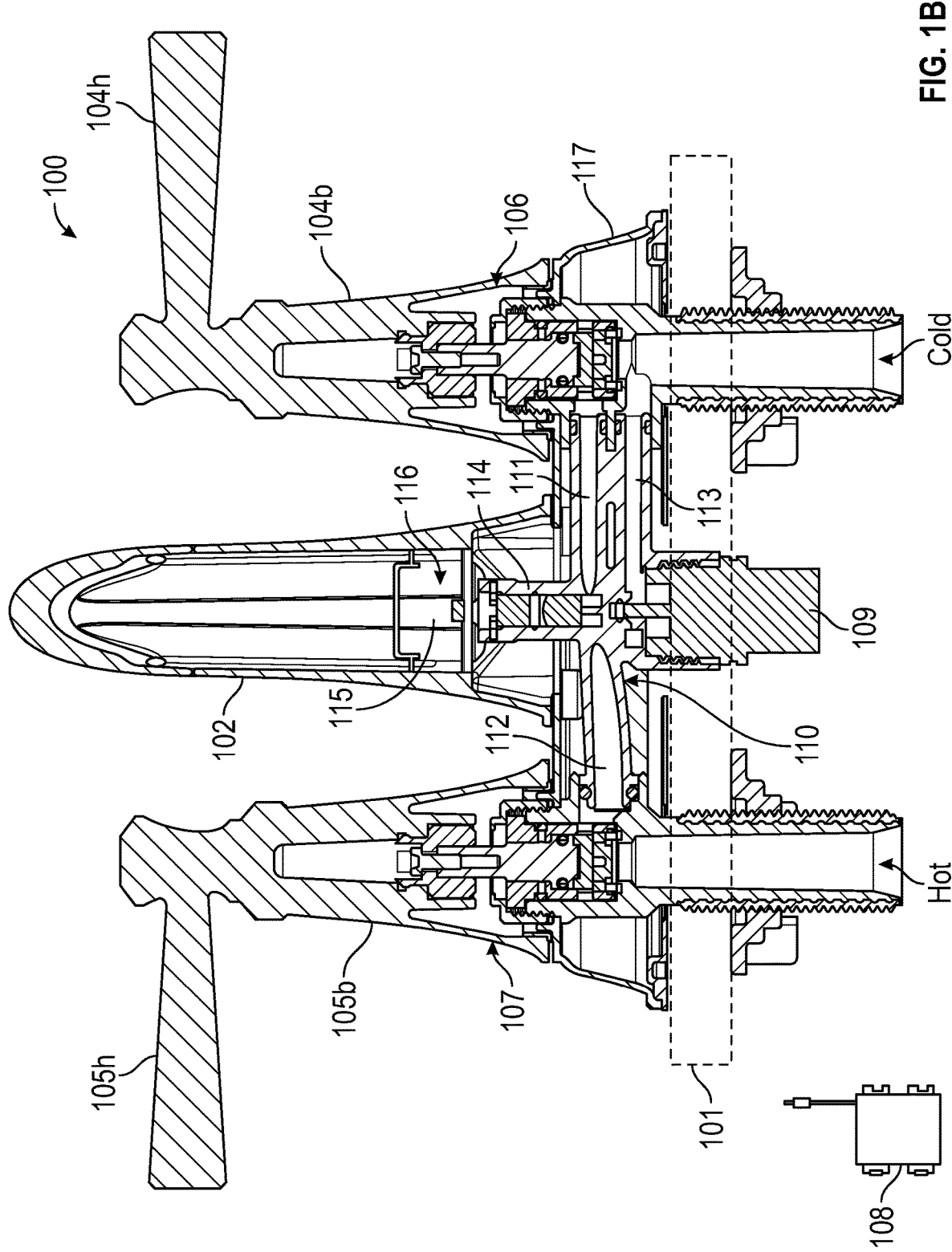
FIG. 1B provides a cross-section view of a faucet assembly, according to some embodiments.

FIG. 1A and FIG. 1B show faucet assembly 100, and a cross-section view of faucet assembly 100, respectively, according to some embodiments. Faucet assembly 100 is installed on deck 101. Deck 101 may be, for example, a vanity surface or other countertop surface. In some embodiments, faucet assembly 100 may be installed on deck 101 in a bathroom, a kitchen, a laundry room, or the like. In some embodiments, when installed, faucet assembly 100 may include several features disposed below deck 101.

Faucet assembly 100 includes controller 108, positioned below deck 101. In some embodiments, controller 108 may include a detection circuit (not shown) where a microcomputer (not shown), programs (not shown), and the like are embedded. When a signal according to a n operation is transmitted to a detection circuit, a signal processed at the detection circuit may be output to electrically open and close electromechanical flow control valve 109. In some embodiments, controller 108 may be electrically connected to a power source such as, but not limited to, a battery. In some embodiments, a power source may be hardwired to an electrical system of a building in which faucet assembly 100 is installed. As such, a power source may alternatively be an alternating current (AC) power source. In some embodiments, controller 108 may be in wired or wireless communication with electromechanical flow control valve 109. When installed, faucet assembly 100 includes several features disposed above deck 101. Faucet assembly 100 includes faucet body 102. Faucet body 102 includes faucet spout 103, which includes an outlet via which water is provided by faucet assembly 100.

Faucet assembly 100 includes first handle 104*h* and second handle 105*h*. First handle 104*h* may be a cold water handle for turning on/off cold water and second handle 105*h* may be a hot water handle for turning on/off hot water. First handle 104*h* is positioned on first handle body 104*b*, and second handle 105*h* is positioned on second handle body 105*b*. A faucet handle is configured to turn relative to a faucet body. First manual flow control valve 106 is positioned within faucet handle body 104*b*, and second manual flow control valve 107 is positioned within faucet handle body 105*b*. Handles 104*h* and 105*h* are associated with flow control valves 106 and 107, respectively, and are configured to operate the valves upon turning the handles.

First manual flow control valve 106 may be connected to a cold water source and second manual flow control valve 107 may be connected to a hot water source. In some embodiments, first manual flow control valve 106 and second manual flow control valve 107 include an opened state and a closed state. In some embodiments, an opened state may include a fully opened state and a partially opened state (alternatively an intermediate state). For example, an opened state may include any degree of opening of first manual flow control valve 106 or second manual flow control valve 107 that would allow water to flow therethrough. In some embodiments, a closed state prevents water from flowing therethrough. First manual flow control valve 106 and second manual flow control valve 107 may be adjusted (via first handle 104*h* and second handle 105*h*, respectively) so that a flow rate of water is adjusted. In addition to adjusting a flow rate of water, a relative opening of first manual flow control valve 106 and second manual flow control valve 107 may in turn determine a temperature of water dispensed based on a mixing of water from a cold water source and a hot water source. Faucet assembly 100 may be referred to as a "center-set" or 4-inch faucet assembly.

In some embodiments, electromechanical flow control valve 109 may include an opened state and a closed state. In some embodiments, electromechanical flow control valve 109 may include a partially opened state. In some embodiments, electromechanical flow control valve 109 may be an electromagnetically actuatable flow control valve. Electromechanical flow control valve 109 may be selectively placed in an opened or closed state based on a signal or instruction from controller 108. In some embodiments, electromechanical flow control valve 109 may be a solenoid valve. In some embodiments, electromechanical flow control valve 109 may be a magnetic solenoid valve. It is to be appreciated that other electronic valves capable of being electronically actuated to control a state of the flow therethrough are possible. In some embodiments, electromechanical flow control valve 109 may be designed such that a flowrate of water is provided when electromechanical flow control valve 109 is preset. In some embodiments, electromechanical valve 109 may be designed to include a partially opened state that varies so that a flowrate of the water may be controlled. It is to be appreciated that a flowrate of the water is also dependent on factors such as, but not limited to, water pressure at a location of installation of faucet assembly 100.

Faucet assembly 100 includes manifold 110 comprising first flow inlet 111, second flow inlet 112, and third flow inlet 113. First flow inlet 111 is fluidly connected to first manual flow control valve 106. Second flow inlet 112 is fluidly connected to second manual flow control valve 107. Third flow inlet 113 is fluidly connected to a cold water source. Electromechanical flow control valve 109 is fluidly connected to a cold water source and third flow inlet 113.

Handle bodies 104b and 105b and faucet body 102 are positioned on faucet base 117. Manifold 110 is positioned within faucet base 117 and includes flow inlets 111, 112, and 113. Faucet base 117 is positioned on deck 101. Manifold 110 is fluidly connected to flow outlet 114. Electromechanical valve 109 is partially positioned below deck 101 and is fluidly coupled to manifold 110 through deck 101.

Fluid line 115 is fluidly connected to flow outlet 114 and faucet spout 103. Faucet assembly 100 may provide water from a cold water source, a hot water source, or a hot/cold water mixture, via flow outlet 114, fluid line 115, and faucet spout 103. In some embodiments, fluid line 115 may be a flexible conduit that may extend through faucet body 102 to faucet spout 103.

Faucet assembly 100 includes activator device 116 in electrical communication with electromechanical flow control valve 109 and controller 108. In some embodiments, activator device 116 may be configured to control electromechanical flow control valve 109 between an opened state and a closed state (or a partially opened state) via a detection circuit in controller 108. In some embodiments, activator device 116 may be positioned on or in faucet body 102. In some embodiments, activator device 116 may be positioned on or in first handle body 104b, on or in second handle body 105b, or a combination thereof. In some embodiments, activator device 116 may communicate via a wired communication or a wireless communication with controller 108.

In some embodiments, activator device 116 includes a sensor. In some embodiments, activator device 116 includes a sensor configured to detect motion, presence of an object, absence of an object, sound, temperature changes, light, electromagnetic fields, alterations in reflected energy, or any combination thereof. In some embodiments, activator device 116 includes an active infrared sensor, a capacitance detection sensor, an optical detection sensor, a thermal detection sensor, or any combination thereof. In some embodiments, activator device 116 includes a plurality of sensors. In some embodiments, activator device 116 includes a microphone. In some embodiments, a microphone may enable a voice-control of a faucet automatic mode. In some embodiments, in response to sensing a signal via activator device 116, a state of electromechanical flow control valve 109 may be modified.

When first manual flow control valve 106 is in an opened state, faucet assembly 100 is configured to deliver water from a cold water source to first manual flow control valve 106, first flow inlet 111, flow outlet 114, fluid line 115, and faucet spout 103. When second manual flow control valve 107 is in an opened state, faucet assembly 100 is configured to deliver water from a hot water source to second manual flow control valve 107, second flow inlet 112, flow outlet 114, fluid line 115, and faucet spout 103. When electromechanical flow control valve 109 is in an opened state, faucet assembly 100 is configured to deliver water from a cold water source to third flow inlet 113, flow outlet 114, fluid line 115, and faucet spout 103.

Faucet assembly 100 may include multiple modes of operation. In a first automatic mode, first handle 104h and second handle 105h may be in an off position in which first manual flow control valve 106 and second manual flow control valve 107 are closed to prevent water from flowing out of faucet spout 103. In a first automatic mode, activator device 116 may control an output of faucet spout 103. For example, in some embodiments, in response to detecting an indication of intended use of faucet assembly 100, activator device 116 may enable flow from faucet spout 103. As such, a first automatic mode may be referred to as a "hands-free" or "touchless" mode. In the illustrated embodiment, a first automatic mode includes only cold water. Activator device 116 may detect intended use when a person places a hand or object near or in front of it.

In a second manual mode, first handle 104h, second handle 105h, or a combination thereof may be moved to an on position via rotation. In an on position, first manual flow control valve 106 and/or second manual flow control valve 107 may be opened to enable flow of water from faucet spout 103. A second manual mode may be referred to as a standard mode, manual mode, mechanical mode, or the like. In a second manual mode, fluid flow may include hot water, cold water, or a hot/cold water mixture. In some embodiments, when entering a second manual mode, activator device 116 and a first automatic mode may be disabled or overridden.

In some embodiments, faucet assembly 100 may include an override assembly (not shown). An override assembly may comprise a cold water switch and a hot water switch. A cold water switch and a hot water switch may be connected to and in electrical communication with controller 108. In operation, a cold water switch and a hot water switch may serve to disable a first automatic mode of operation of faucet assembly 100 when one of first handle 104h, second handle 105h, or both, are turned to an on position. In some embodiments, this switching may disable a first automatic mode of operation so that water flow and temperature is set according to a user's configuration of first handle 104h, second handle 105h, or both. In some embodiments, this may increase a lifetime of electromechanical flow control valve 109 as it is prevented from unnecessary opening/closing cycles. A switch may be associated with a handle. In some embodiments, controller 108 may be configured to disable an automatic mode upon rotating a manual handle to open or close a switch. In other embodiments, simply opening or closing a switch may break a circuit to disable an automatic mode by disabling an electromechanical valve and/or an activator device without any instructions from a controller. Upon restoring a manual handle or handles to a closed position, an automatic mode may be re-enabled.

In another embodiment, assembly 100 may comprise an override assembly (not shown) comprising a flow sensor. A flow sensor may be positioned in manifold 110 and configured to detect water flow from first manual flow control valve 106 and/or second manual flow control valve 107. A flow sensor may be configured to communicate the manual water flow to controller 108, which may be configured to disable electromechanical valve 109 upon receiving the communication from a flow sensor.

Figure 2A:
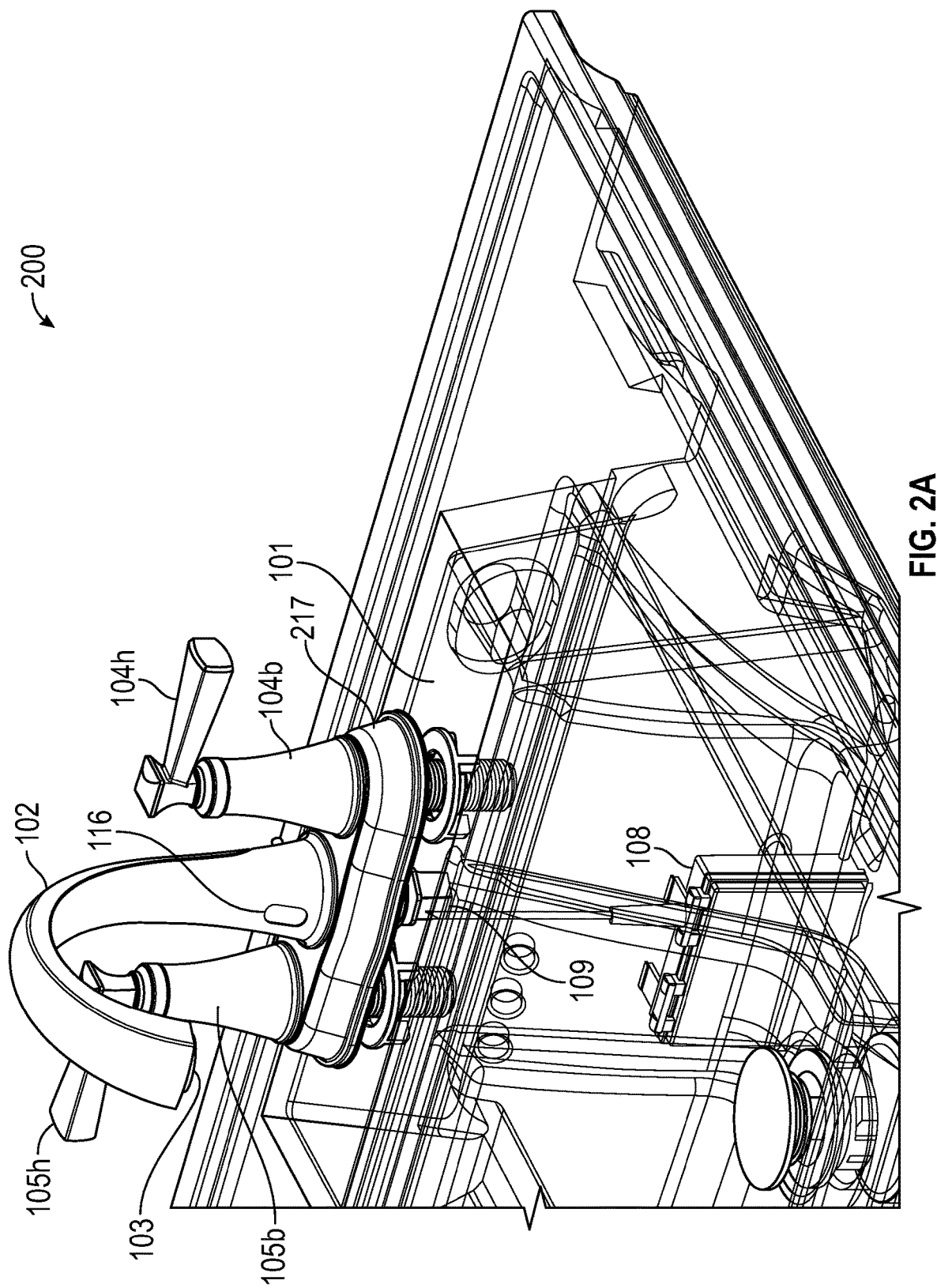
FIG. 2A and FIG. 2B provide views of a faucet assembly, according to some embodiments.
Figure 2B:
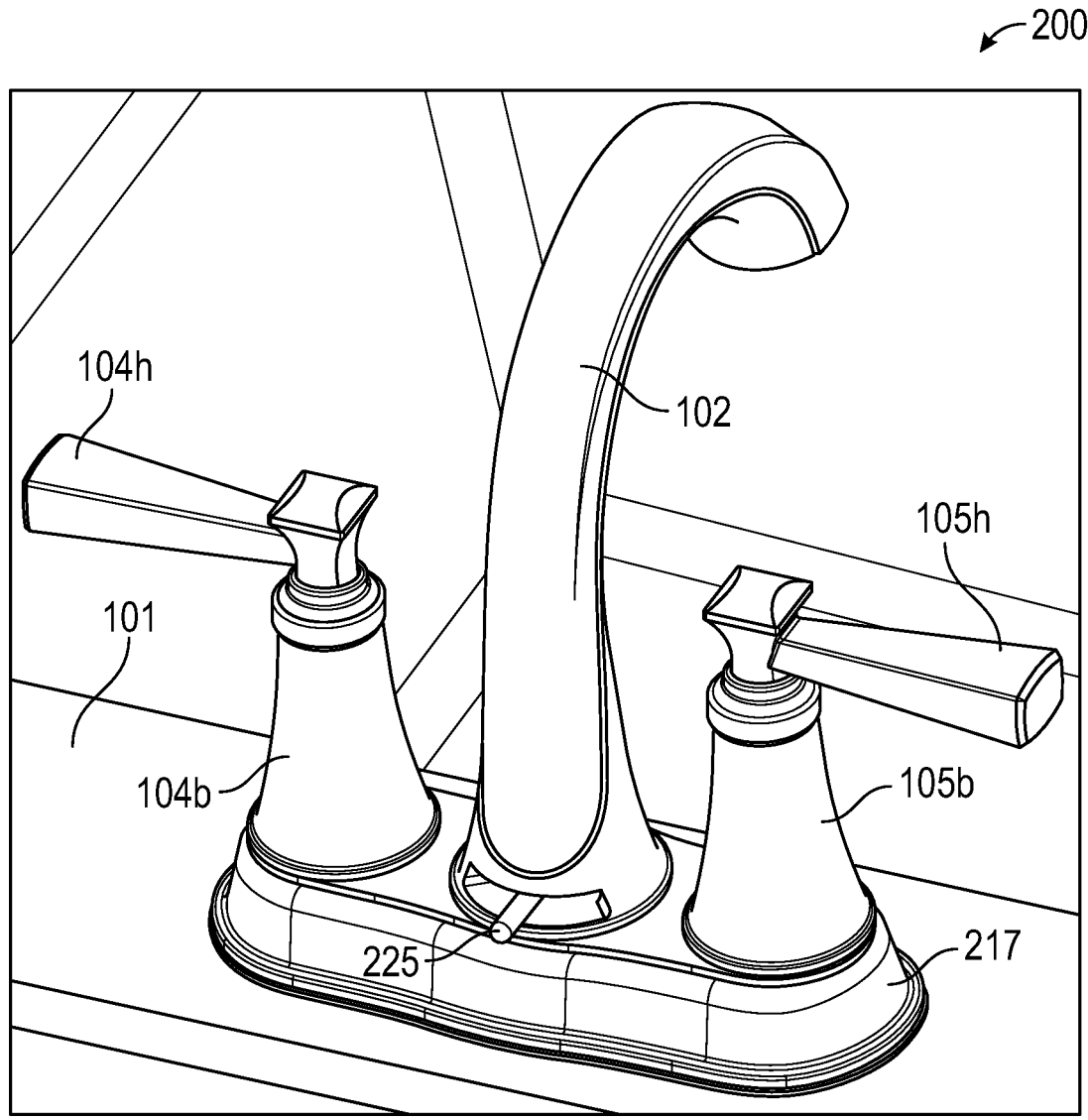

FIG. 2A and FIG. 2B provide views of faucet assembly 200, according to some embodiments. Faucet assembly 200 comprises first handle 104h, first handle body 104b, second handle 105h, second handle body 104b, faucet body 102, faucet spout 103, faucet base 217, electromechanical valve 109, and controller 108. Controller 108 is positioned below deck 101. Valve 109 is electrically connected to controller 108, and both are electrically connected to a power source. Faucet assembly 200 also comprises temperature adjuster (lever) 225 positioned towards a rear of the assembly. Temperature adjuster 225 is configured to control water temperature in an automatic mode. Accordingly, faucet assembly 200 may provide a hot/cold water mixture in an automatic mode as well as in a manual mechanical mode.

Figure 2C:
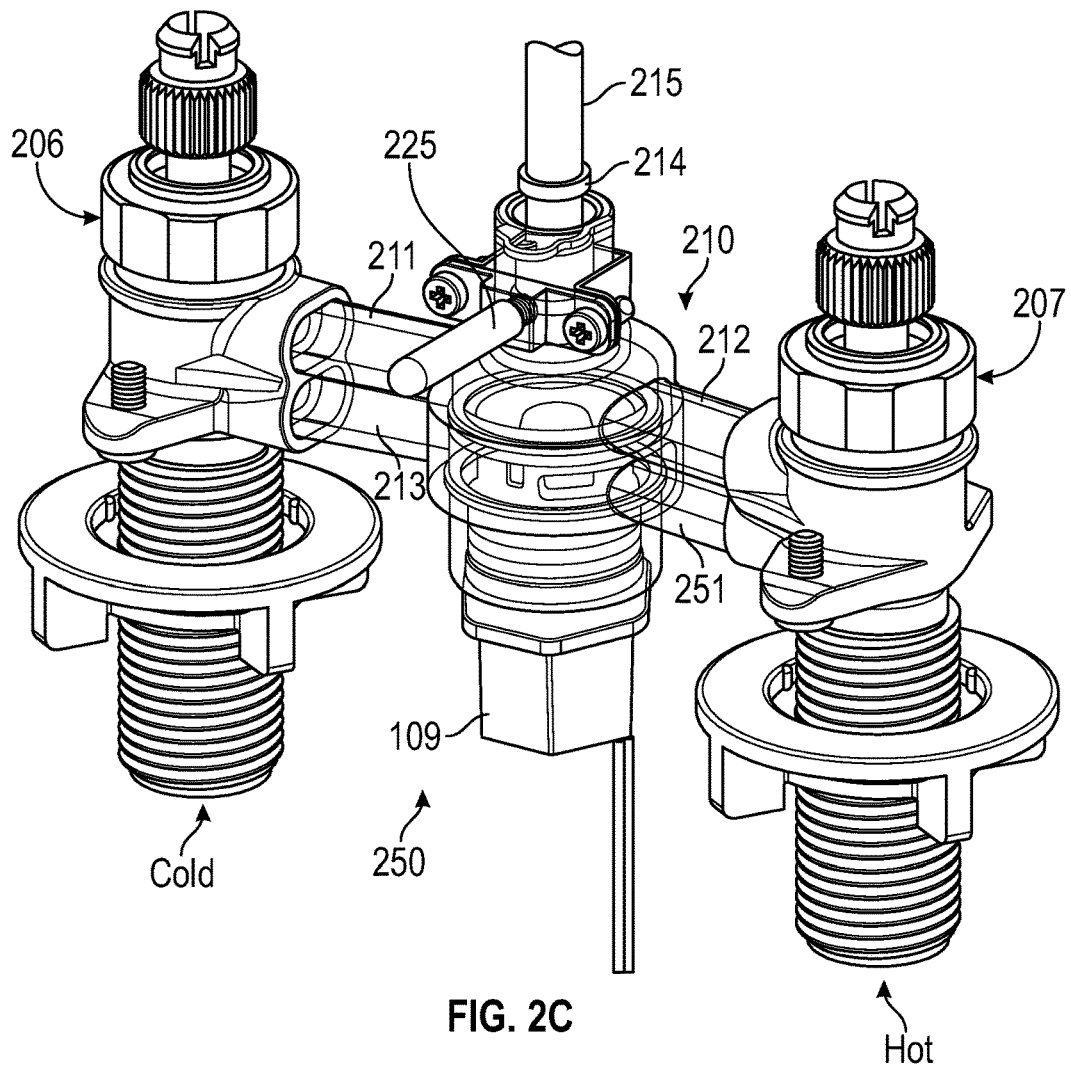
FIG. 2C and FIG. 2D show views of a portion of a faucet assembly, according to some embodiments.
Figure 2D:
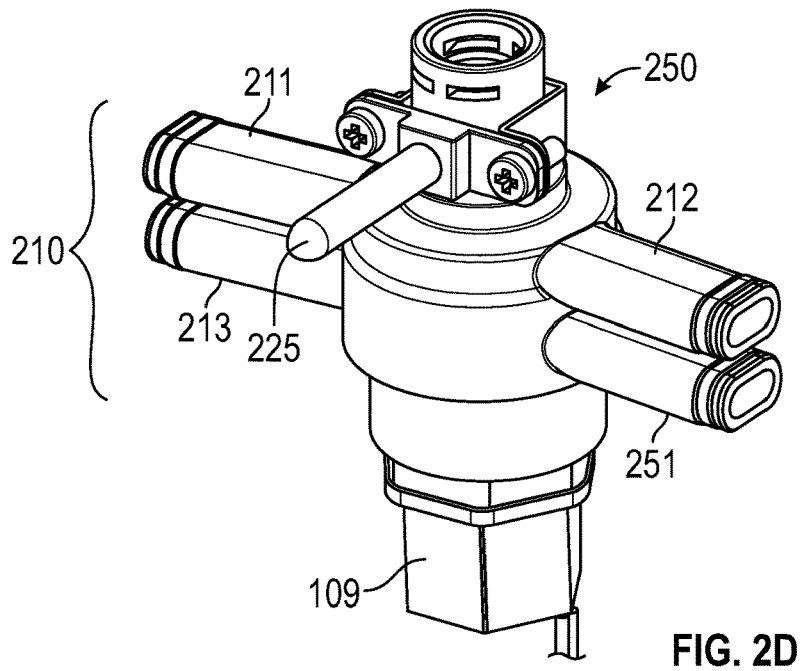

FIG. 2C and FIG. 2D show views of temperature control assembly 250 of faucet assembly 200, according to an embodiment. When first manual flow control valve 206 in an opened state, faucet assembly 200 is configured to deliver water from a cold water source to first manual flow control valve 206, first flow inlet 211, flow outlet 214, fluid line 215, and faucet spout 103. When second manual flow control valve 207 is in an opened state, faucet assembly 200 is configured to deliver water from a hot water source to second manual flow control valve 207, second flow inlet 212, flow outlet 214, fluid line 215, and faucet spout 103. When electromechanical flow control valve 109 is in an opened state, faucet assembly 200 is configured to deliver cold water, hot water, or a hot/cold water mixture from hot and cold water sources to flow inlets 213 and 251, flow outlet 214, fluid line 215, and faucet spout 103. Manifold 210 comprises inlets 211, 212, 213, and 251, positioned in faucet base 217. Manifold 210 is fluidly connected to flow outlet 214. Electromechanical valve 109 is partially positioned below deck 101 and is fluidly coupled to manifold 210 through deck 101.

Temperature control assembly 250 is adjustable to control a temperature of water delivered from faucet spout 103 according to a user setting. In some embodiments, an initial setting of temperature control assembly 250 may be completed at a time of manufacturing. As such, in operation of a first automatic mode (hands-free mode), water output from faucet spout 103 may include a mixture of hot water and cold water.

Temperature control assembly 250 includes temperature adjuster (lever) 225 which may be rotated clockwise and/or counter-clockwise (looking down at assembly 200) to control a temperature of water output by faucet assembly 200. In this embodiment, when temperature adjuster 225 is fully rotated toward cold water flow valve 206, cold water will be delivered. When temperature adjuster 225 is fully rotated toward hot water flow valve 207, hot water will be delivered. Temperature adjuster 225 may for example be rotated over a total of about 180 degrees, or less, for example a total of about 160 degrees, about 140 degrees, about 120 degrees, about 100 degrees, about 80 degrees, or less. In the position shown in FIG. 2C and FIG. 2D, with temperature adjuster 225 facing directly away from a front of faucet assembly 200 (12 o'clock position), an automatic mode will deliver about a 1:1 mix of hot/cold water. In some embodiments, temperature control assembly 250 may include an off position at which the automatic mode of a faucet may be disabled. That is, in an off position, flow may be prevented from a cold water source and a hot water source in an automatic mode. An off position may be used when the user wants to disable an automatic operation of faucet assembly 200. For example, if a user wants to clean without faucet assembly 200 turning on automatically, the user may set temperature control assembly 250 to an off position. In an embodiment, an off position may comprise a push or pull, or an up or down motion of temperature adjuster 225. In an embodiment, temperature adjuster 225, when rotated, is configured to rotate a flow path to adjust a relative amount of hot water and cold water delivered from flow paths 251 and 213 to fluid line 215.

A temperature adjuster may comprise lever as shown. In other embodiments, a temperature adjuster may comprise a rotatable dial, a rotatable knob, or the like.

In some embodiments, faucet assembly 200 may include an override assembly (not shown) comprising a cold water switch and a hot water switch. A cold water switch and a hot water switch may be electrically connected to controller 108. In operation, a cold water switch and a hot water switch may serve to disable an automatic mode when first handle 104h and/or second handle 105h are turned to an on position. A switch may be configured such that upon operating handle 104h and/or 105h, a first automatic mode is disabled so that the water flow and temperature is set according to a user's configuration of handles 104h and/or 105h. For example, actuation of either handle 104h or 105h may disrupt continuity of a detection circuit to disable an automatic mode. In some embodiments, this may increase a lifetime of electromechanical flow control valve 109 as it is prevented from unnecessary opening/closing cycles.

In another embodiment, assembly 200 may comprise an override assembly (not shown) comprising a flow sensor. A flow sensor may be positioned in manifold 210 and configured to detect water flow from first manual flow control valve 206 and/or second manual flow control valve 207. A flow sensor may be configured to communicate manual water flow to controller 108, which may be configured to disable electromechanical valve 109 upon receiving the communication from a flow sensor.

Figure 2E:
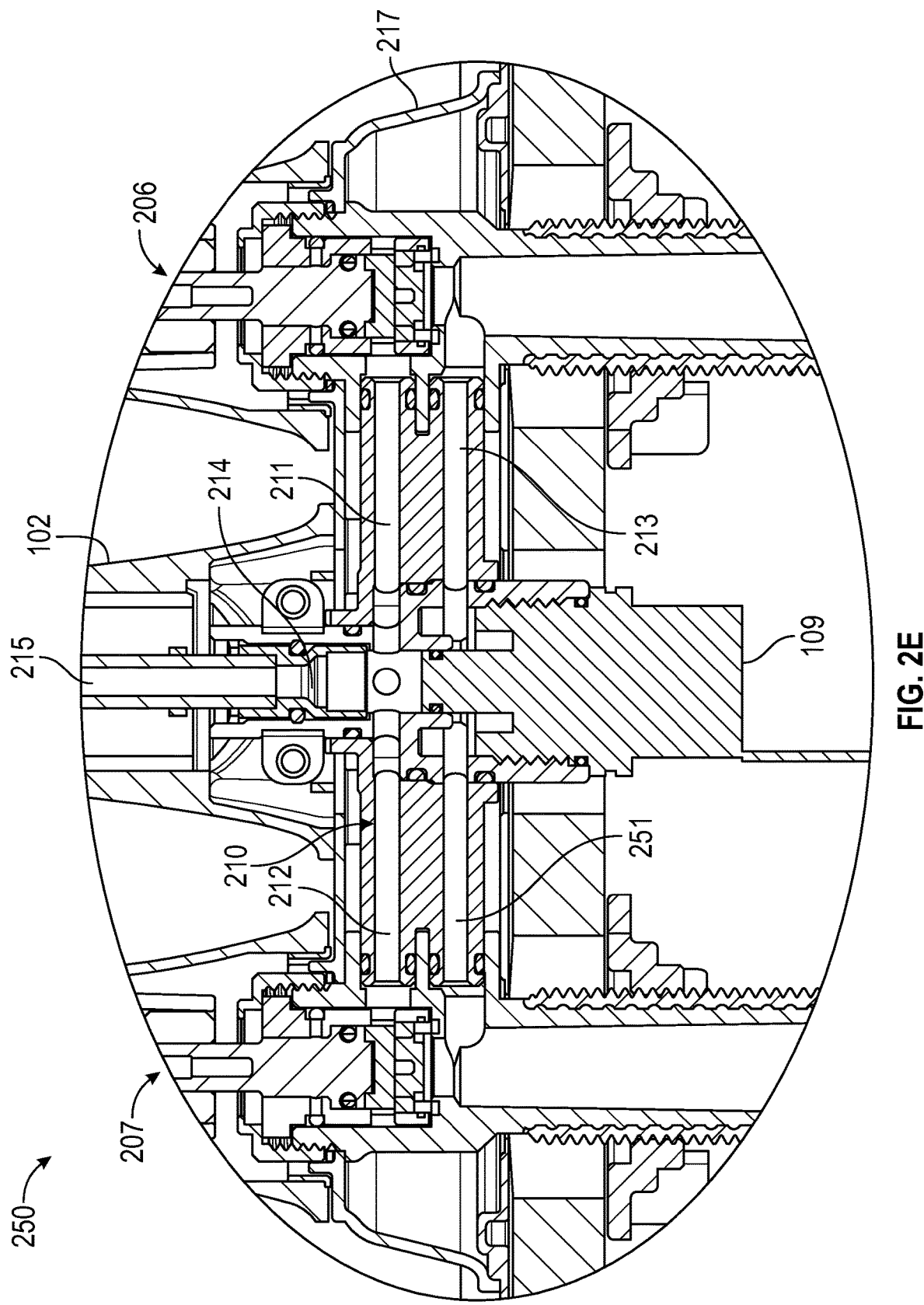
FIG. 2E provides a cross-section view of a portion of a faucet assembly, according to an embodiment.

FIG. 2E provides a cross-section view of temperature control assembly 250. Shown are cold water manual valve 206, hot water manual valve 207, faucet body 102, outlet 214, and fluid line 215. Also shown are flow inlets 211 and 212, configured to deliver cold water and hot water, respectively from manual valves 206 and 207, respectively, to outlet 214 and to fluid line 215. Also shown are flow inlets 213 and 251, configured to deliver cold water and hot water, respectively, through electromechanical valve 109, to outlet 214, and to fluid line 215. Manifold 210 is positioned in faucet base 217 and comprises inlets 211, 212, 213, and 251.

In some embodiments, a faucet assembly is disclosed. In some embodiments, a faucet assembly includes a faucet body and a faucet base. In some embodiments, a faucet body includes a faucet spout. In some embodiments, a faucet assembly includes a first manual flow control valve having an opened state and a closed state. In some embodiments, a first manual flow control valve is configured to be fluidly connected to a cold water source. In some embodiments, a faucet assembly includes a second manual flow control valve having an opened state and a closed state. In some embodiments, a second manual flow control valve is configured to be fluidly connected to a hot water source. In some embodiments, a faucet assembly includes an electromechanical flow control valve having an opened state and a closed state. In some embodiments, a faucet assembly includes a manifold having a plurality of flow inlets and a flow outlet. In some embodiments, a first of a plurality of flow inlets is configured to be fluidly connected to a first manual flow control valve. In some embodiments, a second of a plurality of flow inlets is configured to be fluidly connected to a second manual flow control valve. In some embodiments, a third of a plurality of flow inlets is configured to be fluidly connected to a cold water source. In some embodiments, an electromechanical flow control valve is configured to be fluidly connected to a cold water source and a third of a plurality of flow inlets. In some embodiments, a faucet assembly includes a fluid line configured to be fluidly connected to a flow outlet and a faucet spout. In some embodiments, a faucet assembly includes an activator device configured to be in electrical communication with a controller. In some embodiments, a controller is configured to be in electrical communication with an electromechanical flow control valve.

In some embodiments, an activator device is configured to control an electromechanical flow control valve between an opened state and a closed state. In some embodiments, when a first manual flow control valve is in an opened state, a faucet assembly is configured to deliver water from a cold water source to a first manual flow control valve, a first of a plurality of flow inlets, a flow outlet, a fluid line, and a faucet spout. In some embodiments, when a second manual flow control valve is in an opened state, a faucet assembly is configured to deliver water from a hot water source to a second manual flow control valve, a second of a plurality of flow inlets, a flow outlet, a fluid line, and a faucet spout. In some embodiments, when an electromechanical flow control valve is in an opened state, a faucet assembly is configured to deliver water from a cold water source to a third of a plurality of flow inlets, a flow outlet, a fluid line, and a faucet spout. In some embodiments, a faucet assembly includes a temperature control assembly configured to be fluidly connected to a cold water source, a hot water source, and a third of a plurality of flow inlets. In some embodiments, a temperature control assembly is disposed in a location configured to receive water from a cold water source and from a hot water source. In some embodiments, a temperature control assembly is configured to provide a hot/cold water mixture to a third of a plurality of flow inlets.

In some embodiments, a temperature control assembly includes an off position. In some embodiments, when a temperature control assembly is in an off position, an electromechanical flow control valve is in a closed state. In some embodiments, a temperature control assembly is configured to control a temperature of water in an automatic mode.

In some embodiments, the activator device may be disposed in or on a faucet body. In some embodiments, an electromechanical flow control valve may be an electromagnetically actuatable flow control valve.

In some embodiments, a controller is configured to be electrically connected with a power source. In some embodiments, a power source may be a battery. In some embodiments, a power source may be an alternating current (AC) power source. In some embodiments, an activator device is configured to be in wireless communication with a controller. In some embodiments, an activator device is configured to be in wired communication with a controller.

In some embodiments, a controller is configured to be in wireless communication with an electromechanical flow control valve. In some embodiments, a controller is configured to be in wired communication with an electromechanical flow control valve.

In some embodiments, an activator device may be a sensor. In some embodiments, an activator device may be a sensor configured to detect motion, presence of an object, absence of an object, sound, temperature changes, light, electromagnetic fields, alterations in reflected energy, or any combination thereof. In some embodiments, an activator device may be an active infrared sensor, a capacitance detection sensor, an optical detection sensor, a thermal detection sensor, or any combination thereof. In some embodiments, an activator device may include a plurality of sensors. In some embodiments, an activator device may include a microphone.

In some embodiments, one or more of a first manual flow control valve or a second manual flow control valve may be a mechanical flow control valve. In some embodiments, one or more of a first manual flow control valve or a second manual flow control valve may comprise a switch configured to be in electrical communication with a controller. In some embodiments, in response to one or more of a first manual flow control valve or a second manual flow control valve being in an open position, a switch is configured to break electrical communication with the controller. In some embodiments, in response to a break in electrical communication with a controller, an electromechanical flow control valve may be set to a closed state.

In some embodiments, a switch associated with a manual flow control valve may be in electrical communication with an electromechanical valve and/or an actuator device. Upon rotation of a handle, a circuit associated with a switch may be broken, thereby disabling an electromechanical valve and/or an actuator device, and thereby disabling an automatic mode (without any signal or instruction from a controller). Upon a handle being restored to a closed position, a circuit is closed to re-enable the automatic mode.

In some embodiments, when a first manual flow control valve or a second manual flow control valve is in an opened state, a faucet assembly is in a manual mechanical mode. In some embodiments, when an electromechanical flow control valve is in an opened state, a faucet assembly is in an automatic mode.

In some embodiments, a faucet assembly is disclosed. In some embodiments, a faucet assembly includes a faucet body. In some embodiments, a faucet assembly includes a faucet body and a faucet base. In some embodiments, a faucet body includes a faucet spout. In some embodiments, a faucet assembly includes a first manual flow control valve having an opened state and a closed state. In some embodiments, a first manual flow control valve is configured to be fluidly connected to a cold water source. In some embodiments, a faucet assembly includes a second manual flow control valve having an opened state and a closed state. In some embodiments, a second manual flow control valve is configured to be fluidly connected to a hot water source. In some embodiments, a faucet assembly includes an electromechanical flow control valve having an opened state and a closed state. In some embodiments, a faucet assembly includes a manifold having a plurality of flow inlets and a flow outlet. In some embodiments, a first of a plurality of flow inlets is configured to be fluidly connected to a first manual flow control valve. In some embodiments, a second of a plurality of flow inlets is configured to be fluidly connected to a second manual flow control valve. In some embodiments, a third of a plurality of flow inlets is configured to be fluidly connected to a cold water source. In some embodiments, an electromechanical flow control valve is configured to be fluidly connected to a cold water source and a third of a plurality of flow inlets. In some embodiments, a faucet assembly includes a fluid line configured to be fluidly connected to a flow outlet and a faucet spout. In some embodiments, a faucet assembly includes an activator device configured to be in electrical communication with a controller. In some embodiments, a controller is configured to be in electrical communication with an electromechanical flow control valve. In some embodiments, an activator device is configured to control an electromechanical flow control valve between an opened state and the closed state. In some embodiments, when a first manual flow control valve is in an opened state, a faucet assembly is configured to deliver water from a cold water source to a first manual flow control valve, a first of a plurality of flow inlets, a flow outlet, a fluid line, and a faucet spout. In some embodiments, when a second manual flow control valve is in an opened state, a faucet assembly is configured to deliver water from a water source to a second manual flow control valve, a second of a plurality of flow inlets, a flow outlet, a fluid line, and a faucet spout. In some embodiments, when an electromechanical flow control valve is in an opened state, a faucet assembly is configured to deliver water from a cold water source to a third of a plurality of flow inlets, a flow outlet, a fluid line, and a faucet spout. In some embodiments, a faucet assembly includes a temperature control assembly configured to be fluidly connected to a cold water source, a hot water source, and a third of a plurality of flow inlets. In some embodiments, a temperature control assembly is disposed in a location configured to receive water from a cold water source and water from a hot water source. In some embodiments, a temperature control assembly is configured to provide a hot/cold water mixture to a third of a plurality of flow inlets.

Some embodiments of this disclosure are directed to faucet assemblies capable of operating in different modes, including a hands-free (or automatic) mode and a manual (or standard) mode. The multiple modes can, for example, allow a user to automatically turn on the water from a faucet assembly without touching the faucet assembly or, alternatively, to turn one or more of the handles to turn on the water and control the temperature and flowrate of the water.

In some embodiments, a faucet assembly includes an activator device in electrical communication with an electromechanical flow control valve. In some embodiments, an activator device, or electronic activator device, is present on or in a faucet body. Electrical communication may be via a wire (e.g., electric cable) connected to an activator device and an electromechanical flow control valve. In some embodiments, a wire may also be connected to a power source such as a battery. In some embodiments, electrical communication may be wireless. Examples of suitable wireless communication include, but are not limited to, Wi-Fi, near field communication, Bluetooth®, ZigBee, any combination thereof, or the like.

In some embodiments, an activator device may be present on a front, back, or side of a faucet body. In some embodiments, an activator device may be present on or in a handle body of a faucet assembly. In some embodiments, an activator device may be separate from a faucet body and a faucet assembly and positioned elsewhere in a bathroom.

In some embodiments, a faucet assembly may include one or more indicator lights configured to display a status of the water (e.g., a temperature or the like) or a status of a power source (e.g., a battery, an alternating current (AC) source, or any combination thereof).

An indicator light may be configured to provide light of different colors (e.g. white, blue, green, red, orange, etc.) indicative of water temperature, indicative of a power source being good or no-good and requiring replacing—or indicating that battery has a certain expected life remaining, for example 180 days, 150 days, 120 days, 90 days, 60 days, 45 days, 30 days, 15 days, 10 days, or 5 days.

In some embodiments, a faucet assembly in use may be positioned on a deck (i.e., a countertop).

Following are some non-limiting embodiments of the disclosure.

In a first embodiment, disclosed is a faucet assembly comprising a faucet body; a faucet spout; a first manual flow control valve; a second manual flow control valve; an electromechanical valve; a controller; and an activator device, wherein the first manual flow control valve is configured to be fluidly connected to a cold water source and to deliver cold water to the faucet spout, the second manual flow control valve is configured to be fluidly connected to a hot water source and to deliver hot water to the faucet spout, the electromechanical valve is configured to be fluidly connected to a cold water source, the electromechanical valve, the controller, and the activator device are configured to be in electrical communication, and the controller is configured to receive a signal from the activator device indicating it has been activated, and to send a signal to the electromechanical valve to open to deliver cold water to the faucet spout.

In a second embodiment, disclosed is a faucet assembly according to the first embodiment, wherein the faucet assembly is configured to be operated in a manual mode via operation the first and/or second manual flow control valves, and to be operated in an automatic mode via operation of the electromechanical valve. In a third embodiment, disclosed is a faucet assembly according to the second embodiment, wherein the faucet assembly is configured such that the automatic mode is disabled upon operation of the first and/or second manual flow control valves.

In a fourth embodiment, disclosed is a faucet assembly according to the third embodiment, comprising an override assembly associated with the first and/or second manual flow control valves, wherein the override assembly is in electrical communication with the controller, upon operation of the first and/or second manual flow control valves, the override assembly is configured to communicate the manual valve operation to the controller, and the controller is configured to disable the electromechanical valve and/or the activator device upon receiving the communication from the override assembly, or the override assembly is in electrical communication with the electromechanical valve and/or with the activator device, and upon operation of the first and/or second manual flow control valves, the override assembly is configured to disable the electromechanical valve and/or the activator device.

In a fifth embodiment, disclosed is a faucet assembly according to the fourth embodiment, wherein the override assembly comprises a flow sensor in electrical communication with the controller, upon operation of the first and/or second manual flow control valves, the flow sensor is configured to detect water flow from the first and/or second manual flow control valves, and to communicate the water flow to the controller, and the controller is configured to disable the electromechanical valve upon receiving the communication from the flow sensor.

In a sixth embodiment, disclosed is a faucet assembly according to the fourth embodiment, wherein the override assembly comprises an electric switch in electrical communication with the controller, upon operation of the first and/or second manual flow control valves, the electric switch is configured to detect movement of a faucet handle associated with the first and second manual flow control valves, and to communicate the faucet handle movement to the controller, and the controller is configured to disable the electromechanical valve upon receiving the communication from the switch.

In a seventh embodiment, disclosed is a faucet assembly according to the fourth embodiment, wherein the override assembly comprises an electric switch in electrical communication with the electromechanical valve and/or the activator device, upon operation of the first and/or second manual flow control valves, the electric switch is configured to break a circuit, and the electromechanical valve and/or the activator are disabled upon breaking the circuit.

In an eighth embodiment, disclosed is a faucet assembly according to any of the preceding embodiments, comprising a temperature control assembly comprising the electromechanical valve and a temperature adjuster, wherein the electromechanical valve is configured to be fluidly connected to a cold water source and to a hot water source, the electromechanical valve is configured to deliver a hot/cold water mixture to the faucet spout, and the temperature adjuster is configured to adjust a ratio of hot water and cold water in the hot/cold water mixture.

In a ninth embodiment, disclosed is a faucet assembly according to the eighth embodiment, wherein the temperature adjuster is configured to be set manually. In a tenth embodiment, disclosed is a faucet assembly according to embodiments 8 or 9, wherein the temperature adjuster comprises an off position, wherein an automatic mode is disabled. In an eleventh embodiment, disclosed is a faucet assembly according to any of embodiments 8 to 10, wherein the temperature adjuster comprises a lever, a rotatable dial, or a rotatable knob. In a twelfth embodiment, disclosed is a faucet assembly according to any of embodiments 8 to 11, wherein the temperature adjuster comprises a rotatable lever.

In a thirteenth embodiment, disclosed is a faucet assembly according to any of the preceding embodiments, wherein the activator device is positioned on or in the faucet body. In a fourteenth embodiment, disclosed is a faucet assembly according to any of the preceding embodiments, wherein the activator device is configured to be in wired or wireless electronic communication with the controller.

In a fifteenth embodiment, disclosed is a faucet assembly according to any of the preceding embodiments, wherein the controller is configured to be in wired or wireless electronic communication with the electromechanical valve.

In a sixteenth embodiment, disclosed is a faucet assembly according to any of the preceding embodiments, wherein the activator device comprises one or more of a motion sensor, a presence sensor, and a microphone. In a seventeenth embodiment, disclosed is a faucet assembly according to any of the preceding embodiments, wherein the activator device comprises one or more of an infrared sensor, a capacitive sensor, an optical sensor, or a thermal detection sensor.

In an eighteenth embodiment, disclosed is a faucet assembly according to any of the preceding embodiments, comprising a manifold, wherein the faucet assembly is configured to positioned on a deck, the manifold is configured to be positioned above the deck, the manifold is fluidly connected to the first manual flow control valve, to the second manual flow control valve, to the electromechanical valve, and to the faucet spout.

In a nineteenth embodiment, disclosed is a faucet assembly according to embodiment 18, wherein the controller is configured to be positioned below the deck. In a twentieth embodiment, disclosed is a faucet assembly according to embodiments 18 or 19, wherein the electromechanical valve is fluidly coupled to the manifold through the deck.

When elements are configured to receive from or configured to deliver or provide to another element, or when elements are coupled to other elements regarding fluid flow, the elements are in fluid communication with each other.

The terms "coupled" or "connected" may mean that an element is "attached to" or "associated with" another element.

Coupled or connected may mean directly coupled or coupled through one or more other elements. An element may be coupled to an element through two or more other elements in a sequential manner or a non-sequential manner. The term "via" in reference to "via an element" may mean "through" or "by" an element. Coupled or connected or "associated with" may also mean elements not directly or indirectly attached, but that they "go together" in that one may function together with the other.

The term "towards" in reference to a of point of attachment, may mean at exactly that location or point or, alternatively, may mean closer to that point than to another distinct point, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive.

Features described in connection with one embodiment of the disclosure may be used in conjunction with other embodiments, even if not explicitly stated.

Embodiments of the disclosure include any and all parts and/or portions of the embodiments, claims, description and figures. Embodiments of the disclosure also include any and all combinations and/or sub-combinations of embodiments.

The invention claimed is:
1. A faucet assembly comprising
a faucet body;
a faucet spout;
a first manual flow control valve;
a second manual flow control valve;
an electromechanical valve;
a manifold;
a controller; and
an activator device,
wherein
the first manual flow control valve is configured to be fluidly connected to a cold water source and to deliver cold water to the faucet spout, the second manual flow control valve is configured to be fluidly connected to a hot water source and to deliver hot water to the faucet spout, the electromechanical valve is configured to be fluidly connected to the cold water source, the electromechanical valve, the controller, and the activator device are configured to be in electrical communication, the manifold comprises a first flow inlet fluidly connected to the first manual flow control valve, a second flow inlet fluidly connected to the second manual flow control valve, and a third flow inlet fluidly connected to the electromechanical valve and to the cold water source, the manifold is fluidly connected to a flow outlet, and the controller is configured to receive a signal from the activator device indicating it has been activated, and to send a signal to the electromechanical valve to open to deliver cold water to the faucet spout.

2. The faucet assembly according to claim 1, wherein the faucet assembly is configured to be independently operated in a manual mode via operation of the first and/or second manual flow control valves, and to be independently operated in an automatic mode via operation of the electromechanical valve.

3. The faucet assembly according to claim 2, wherein the automatic mode is disabled upon operation of the first and/or second manual flow control valves.

4. The faucet assembly according to claim 3, comprising an override assembly associated with the first and/or second manual flow control valves, wherein the override assembly is in electrical communication with the controller, upon operation of the first and/or second manual flow control valves, the override assembly is configured to communicate the manual valve operation to the controller, and the controller is configured to disable the electromechanical valve and/or the activator device upon receiving the communication from the override assembly, or the override assembly is in electrical communication with the electromechanical valve and/or with the activator device, and upon operation of the first and/or second manual flow control valves, the override assembly is configured to disable the electromechanical valve and/or the activator device.

5. The faucet assembly according to claim 4, wherein the override assembly comprises a flow sensor in electrical communication with the controller, upon operation of the first and/or second manual flow control valves, the flow sensor is configured to detect water flow from the first and/or second manual flow control valves, and to communicate the water flow to the controller, and the controller is configured to disable the electromechanical valve upon receiving the communication from the flow sensor.

6. The faucet assembly according to claim 4, wherein the override assembly comprises an electric switch in electrical communication with the controller, upon operation of the first and/or second manual flow control valves, the electric switch is configured to detect movement of a faucet handle associated with the first and second manual flow control valves, and to communicate the faucet handle movement to the controller, and the controller is configured to disable the electromechanical valve upon receiving the communication from the switch.

7. The faucet assembly according to claim 4, wherein the override assembly comprises an electric switch in electrical communication with the electromechanical valve and/or the activator device, upon operation of the first and/or second manual flow control valves, the electric switch is configured to break a circuit, and the electromechanical valve and/or the activator are disabled upon breaking the circuit.

8. The faucet assembly according to claim 2, comprising a temperature control assembly comprising the electromechanical valve and a temperature adjuster, wherein the electromechanical valve is configured to be fluidly connected to the cold water source and to the hot water source, the electromechanical valve is configured to deliver a hot/cold water mixture to the faucet spout, and the temperature adjuster is configured to adjust a ratio of hot water and cold water in the hot/cold water mixture.

9. The faucet assembly according to claim 8, wherein the temperature adjuster is configured to be set manually.

10. The faucet assembly according to claim 8, wherein the temperature adjuster comprises an off position, and wherein when the temperature adjuster is in the off position, the automatic mode is disabled.

11. The faucet assembly according to claim 8, wherein the temperature adjuster comprises a lever, a rotatable dial, or a rotatable knob.

12. The faucet assembly according to claim 8, wherein the temperature adjuster comprises a rotatable lever.

13. The faucet assembly according to claim 1, wherein the manifold comprises a fourth flow inlet fluidly connected to the electromechanical valve and to the hot water source.

14. The faucet assembly according to claim 1, wherein the faucet assembly is configured to be positioned on a deck, and the manifold is configured to be positioned above the deck.

15. The faucet assembly according to claim 14, wherein the electromechanical valve is fluidly coupled to the manifold through the deck.

16. The faucet assembly according to claim 1, wherein the activator device is positioned on or in the faucet body.

17. The faucet assembly according to claim 1, wherein the activator device is configured to be in wired or wireless electronic communication with the controller.

18. The faucet assembly according to claim 1, wherein the controller is configured to be in wired or wireless electronic communication with the electromechanical valve.

19. The faucet assembly according to claim 1, wherein the activator device comprises one or more of a motion sensor, a presence sensor, or a microphone.

20. The faucet assembly according to claim 1, wherein the activator device comprises one or more of an infrared sensor, a capacitive sensor, an optical sensor, or a thermal detection sensor.

* * * * *